United States Patent Office 2,888,479
Patented May 26, 1959

2,888,479

GAMMA-(TRIMETHYLSILOXY)-PROPYL-BIS-(TRIMETHYLSILOXY)-ETHYLSILANE

Donald L. Bailey, Snyder, N.Y., assignor to Union Carbide Corporation, a corporation of New York No Drawing. Application December 17, 1957
Serial No. 703,259

1 Claim. (Cl. 260—448.2)

This invention relates to a novel organosilcon compound. More particularly, the invention contemplates the provision of the specific organosilicon compound, gamma-(trimethylsiloxy)propyl-bis (trimethylsiloxy)ethylsilane, as represented by the following structural formula:

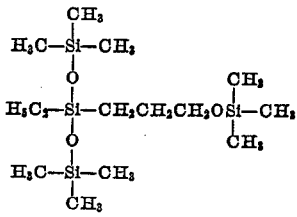

The invention is based on my discovery that the foregoing siloxane structure can be synthesized by the thermal addition of bis(trimethylsiloxy)ethylsilane-[(Me₃SiO)₂Si(Et)H] to the allyloxy silane, trimethylallyloxysilane[Me₃SiOCH₂CH=CH₂], in the presence of a platinum catalyst. In essence, the synthesis involves the formation of a reaction mixture comprising the silanic hydrogen-bonded siloxane, the unsaturated organosilane, and a small amount of a platinum catalyst, followed by heating the reaction mixture to cause the components to react under influence of the platinum catalyst to effect decomposition of the silanic hydrogen bond of the siloxane and addition of the resulting silyl and hydrogen free radicals to respective carbon atoms of the carbon to carbon multiple bond of the unsaturated organosilane, with the production of the desired compound as an adduct of the component reactants.

The starting material bis(trimethylsiloxy)ethylsilane employed in synthesizing the novel compound of the invention may be produced by any one of several conventional procedures. Thus, it can be produced, for example, by acid equilibration of hexamethyl disiloxane with ethylhydrogenpolysiloxane at room temperature (25° C.) in the presence of from 0.5 to 1 percent by weight of sulfuric acid as catalyst.

The platinum catalyst used in promoting addition of the siloxane to the allyloxy silane, is preferably employed in finely-divided form either alone, or in combination with an inert support such as charcoal, and the like, or in the form of a multicomponent or heterogeneous catalyst consisting of platinum deposited on the gamma-allotrope of alumina (platinum-on-gamma-alumina).

It is found that the relative concentration of platinum employed for catalyzing the addition reaction is not overly critical, but rather, concentrations of the elemental metal ranging from 0.001 part to about 5 parts by weight of the reactants can be employed and satisfactory results are obtained. When the catalyst is employed in the form of a heterogeneous substance such as platinum-on-gamma-alumina, concentrations of the order of one to two percent by weight of the heterogeneous substance, containing one to two percent by weight of elemental platinum, function admirably for the purpose intended.

Generally, the reaction time and temperature of reaction are also relatively non-critical, and, in most cases, the reaction can be brought to completion with good yields of the desired adduct by heating the reactants at temperatures within the range 80–180° C. for periods ranging from 4 to 10 hours. In actual practice, I prefer to operate at temperatures within the range 140–150° C. It is relatively essential, however, to effect stirring or agitation of the reaction mixture throughout the time of treatment in order to establish and maintain uniform dispersion of the solid catalyst within the liquid reaction phase.

The compound of the invention finds particular utility as an intermediate for the production of silicone polymers containing a hydroxyl substituent. Thus, by hydrolysis of the carbon-oxygen-silicon bond followed by equilibration with cyclic siloxanes, silicone oils containing hydroxyl substituents can be produced. These oils may be used to introduce silicon functional groups into alkyd resins or other organic systems which are reactive towards the hydroxyl group.

It is believed that the invention may be best understood by reference to the following specific example describing the foregoing principles and procedures as applied to the production of the novel compound of the invention:

EXAMPLE

*Preparation of gamma-trimethylsiloxypropyl-bis(trimethylsiloxy)ethylsilane[Me₃SiO(CH₂)₃Si(Et)(OSiMe₃)₂] by addition of bis(trimethylsiloxy)ethylsilane to trimethyl allyloxysilane*

Into a 500 cubic centimeter flask equipped with a stirrer, dropping funnel and inlet tube, were charged 71 grams (0.3 mole) of (Me₃SiO)₂Si(Et)H and 1 gram of one percent by weight platinum-on-gamma-alumina catalyst. The flask was placed in an oil bath at 145–150° C. and heated for 9.5 hours during which time 26 grams (0.2 mole) of Me₃SiOCH₂CH=CH₂ was added dropwise. The products were filtered and stripped to 150° C. at 1 mm. pressure. 83 grams of distillable products were recovered. Fractionation yielded 48 grams (66 mole-percent yield) of the desired adduct. The compound yielded the following physical and analytical data:

Boiling point _____ 78–82° C./0.7 mm.
Refractive index ($n_D^{25}$) _____ 1.4113.

|  | Percent Si | Mol. Wt. |
|---|---|---|
| Found | 30.2 | 355 |
| Theoretical | 30.6 | 366 |

Having thus described the subject matter of my invention, what it is desired to secure by Letters Patent is:

Gamma - (trimethylsiloxy)propyl - bis(trimethylsiloxy)ethylsilane.

References Cited in the file of this patent

UNITED STATES PATENTS 2,823,218  Speier et al. _____ Feb. 11, 1958

FOREIGN PATENTS 1,117,542  France _____ Feb. 27, 1956